US008499550B2

(12) United States Patent
Perfetto et al.

(10) Patent No.: US 8,499,550 B2
(45) Date of Patent: Aug. 6, 2013

(54) APPARATUS, SYSTEM, AND METHOD FOR CONTROLLING PARTICULATE ACCUMULATION ON AN ENGINE FILTER DURING ENGINE IDLING

(75) Inventors: Anthony Perfetto, Columbus, IN (US); Brent Engel, Hope, IN (US)

(73) Assignee: Cummins IP, Inc., Minneapolis, MN (US)

( * ) Notice: Subject to any disclaimer, the term of this patent is extended or adjusted under 35 U.S.C. 154(b) by 1020 days.

(21) Appl. No.: 12/124,057

(22) Filed: May 20, 2008

(65) Prior Publication Data
US 2009/0288398 A1 Nov. 26, 2009

(51) Int. Cl.
*F01N 3/00* (2006.01)
*F01N 3/02* (2006.01)

(52) U.S. Cl.
USPC ............... 60/295; 60/274; 60/280; 60/285; 60/297; 60/311

(58) Field of Classification Search
USPC ............... 60/274, 285, 295, 297, 311
See application file for complete search history.

(56) References Cited

U.S. PATENT DOCUMENTS

| | | | |
|---|---|---|---|
| 4,651,524 A | 3/1987 | Brighton | |
| 4,914,065 A | 4/1990 | Hijikata et al. | |
| 5,915,626 A | 6/1999 | Awarzamani et al. | |
| 6,135,100 A | 10/2000 | Katoh | |
| 6,279,603 B1 | 8/2001 | Czarnik et al. | |
| 6,304,815 B1 | 10/2001 | Moraal et al. | |
| 6,405,528 B1 | 6/2002 | Christen et al. | |
| 6,408,834 B1 | 6/2002 | Brackney et al. | |
| 6,481,641 B1 | 11/2002 | Mieney | |
| 6,491,016 B1 | 12/2002 | Buratti | |

(Continued)

FOREIGN PATENT DOCUMENTS

| | | |
|---|---|---|
| EP | 1 281 852 A2 | 5/2003 |
| EP | 1 350 941 B1 | 12/2004 |

(Continued)

OTHER PUBLICATIONS

PCT/US2009/044698, International Search Report and Written Opinion, Jan. 4, 2010.

*Primary Examiner* — Binh Q Tran
*Assistant Examiner* — Diem Tran
(74) *Attorney, Agent, or Firm* — Kunzler Law Group, PC

(57) ABSTRACT

According to one representative embodiment, an apparatus disclosed herein includes a regeneration event timing module, an engine speed module, an exhaust gas temperature module, and a thermal management module. The regeneration event timing module is configured to determine a regeneration event timing strategy for implementation during extended idling of the engine. The regeneration event timing strategy includes a first time period and a second time period following the first time period. The engine speed module is configured to determine a desired engine speed for the second time period and operate the engine at the desired engine speed during the second time period. The desired engine speed is greater than an idling engine speed associated with the first time period. The exhaust gas temperature module is configured to determine a desired particulate matter filter inlet exhaust gas temperature. The desired particulate matter filter inlet exhaust gas temperature corresponds to a particulate matter filter temperature for achieving a noxidation regeneration of particulate matter on the particulate matter filter. The thermal management module is configured to modulate at least one engine system component to achieve the desired particulate matter filter inlet exhaust gas temperature during the second time period.

15 Claims, 7 Drawing Sheets

U.S. PATENT DOCUMENTS

| | | |
|---|---|---|
| 6,594,990 B2 | 7/2003 | Kuenstler et al. |
| 6,622,480 B2 | 9/2003 | Tashiro et al. |
| 6,634,170 B2 | 10/2003 | Hiranuma et al. |
| 6,644,020 B2 | 11/2003 | Kuenstler et al. |
| 6,666,020 B2 | 12/2003 | Tonetti et al. |
| 6,729,128 B2 | 5/2004 | Shiratani et al. |
| 6,735,941 B2 | 5/2004 | Saito et al. |
| 6,756,904 B2 | 6/2004 | Kinugawa et al. |
| 6,758,039 B2 | 7/2004 | Kuboshima et al. |
| 6,802,180 B2 * | 10/2004 | Gabe et al. ................. 60/285 |
| 6,805,095 B2 | 10/2004 | Sun et al. |
| 6,814,303 B2 | 11/2004 | Edgar et al. |
| 6,820,418 B2 | 11/2004 | Nakatani et al. |
| 6,829,889 B2 | 12/2004 | Saito et al. |
| 6,829,890 B2 | 12/2004 | Gui et al. |
| 6,851,258 B2 | 2/2005 | Kawashima et al. |
| 6,854,265 B2 | 2/2005 | Saito et al. |
| 6,862,881 B1 | 3/2005 | Klingbeil et al. |
| 6,862,927 B2 | 3/2005 | Craig et al. |
| 6,865,885 B2 | 3/2005 | Kitahara |
| 6,901,747 B2 | 6/2005 | Tashiro et al. |
| 6,901,751 B2 | 6/2005 | Bunting et al. |
| 6,907,873 B2 | 6/2005 | Hamahata |
| 6,910,329 B2 | 6/2005 | Bunting et al. |
| 6,925,802 B2 | 8/2005 | Arnold |
| 6,928,809 B2 | 8/2005 | Inoue et al. |
| 6,941,750 B2 | 9/2005 | Boretto et al. |
| 6,948,476 B2 | 9/2005 | Gioannini et al. |
| 6,951,100 B2 | 10/2005 | Kuboshima et al. |
| 6,952,919 B2 | 10/2005 | Otake et al. |
| 6,959,541 B2 | 11/2005 | Kosaka et al. |
| 6,966,178 B2 | 11/2005 | Saito et al. |
| 6,969,413 B2 | 11/2005 | Yahata et al. |
| 6,978,603 B2 | 12/2005 | Asanuma |
| 6,978,604 B2 | 12/2005 | Wang et al. |
| 6,983,591 B2 | 1/2006 | Kondo et al. |
| 6,988,361 B2 | 1/2006 | van Nieuwstadt et al. |
| 7,000,384 B2 | 2/2006 | Kagenishi |
| 7,031,827 B2 | 4/2006 | Trudell et al. |
| 7,031,877 B2 | 4/2006 | LeGore et al. |
| 7,044,118 B2 | 5/2006 | Tonetti et al. |
| 7,054,734 B2 | 5/2006 | Todoroki et al. |
| 7,062,906 B2 * | 6/2006 | Otake et al. ................. 60/295 |
| 7,069,721 B2 | 7/2006 | Gotou |
| 7,107,760 B2 | 9/2006 | Shirakawa |
| 7,111,455 B2 | 9/2006 | Okugawa et al. |
| 7,137,247 B2 | 11/2006 | Koga et al. |
| 7,147,693 B2 | 12/2006 | Inoue et al. |
| 7,155,334 B1 | 12/2006 | Stewart et al. |
| 7,162,867 B2 | 1/2007 | Saito et al. |
| 7,169,364 B2 | 1/2007 | Ohtake et al. |
| 7,200,991 B2 | 4/2007 | Otake et al. |
| 7,208,029 B2 | 4/2007 | Shirakawa et al. |
| 7,231,291 B2 | 6/2007 | Dollmeyer et al. |
| 7,254,940 B2 | 8/2007 | Saitoh et al. |
| 7,261,086 B2 * | 8/2007 | Nuang ..................... 123/436 |
| 7,264,642 B2 | 9/2007 | Hamahata et al. |
| 7,275,365 B2 | 10/2007 | Zhan et al. |
| 2002/0112472 A1 | 8/2002 | Tashiro et al. |
| 2002/0196153 A1 | 12/2002 | Kinugawa et al. |
| 2003/0167757 A1 | 9/2003 | Boretto et al. |
| 2003/0200742 A1 | 10/2003 | Smaling |
| 2003/0230079 A1 | 12/2003 | Kuboshima et al. |
| 2004/0103654 A1 | 6/2004 | Ohtake et al. |
| 2004/0159098 A1 | 8/2004 | Gui et al. |
| 2004/0159099 A1 | 8/2004 | Kuboshima et al. |
| 2004/0172933 A1 | 9/2004 | Saito et al. |
| 2004/0194453 A1 | 10/2004 | Koga et al. |
| 2004/0200271 A1 | 10/2004 | van Nieuwstadt |
| 2004/0204818 A1 | 10/2004 | Trudell et al. |
| 2004/0237513 A1 | 12/2004 | Bunting et al. |
| 2005/0022519 A1 | 2/2005 | Shirakawa |
| 2005/0022520 A1 | 2/2005 | Shirakawa et al. |
| 2005/0044846 A1 | 3/2005 | Yahata et al. |
| 2006/0086095 A1 | 4/2006 | Da-Silva et al. |
| 2006/0096280 A1 | 5/2006 | Zhan et al. |
| 2006/0112679 A1 | 6/2006 | Kojima et al. |
| 2006/0277898 A1 | 12/2006 | McCarthy, Jr. |
| 2007/0006577 A1 | 1/2007 | Yokoyama et al. |
| 2007/0214772 A1 | 9/2007 | England |

FOREIGN PATENT DOCUMENTS

| | | |
|---|---|---|
| EP | 1 568 865 A1 | 8/2005 |
| EP | 1 363 009 B1 | 6/2006 |
| EP | 1 122 417 B1 | 9/2006 |
| EP | 1 744 042 A1 | 1/2007 |

* cited by examiner

APPARATUS, SYSTEM, AND METHOD FOR CONTROLLING PARTICULATE ACCUMULATION ON AN ENGINE FILTER DURING ENGINE IDLING

FIELD

This disclosure relates to controlling the temperature of engine exhaust, and more particularly to controlling particulate matter accumulation on a particulate matter filter during idling operation of an engine by controlling engine exhaust temperature.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which all engines must comply. Generally, emission requirements vary according to engine type. Emission tests for compression-ignition (diesel) engines typically monitor the release of diesel particulate matter, nitrogen oxides ($NO_x$), and unburned hydrocarbons. Catalytic converters implemented in an exhaust gas aftertreatment system have been used to eliminate many of the pollutants present in exhaust gas. However, to remove diesel particulate matter, typically a diesel particulate filter (DPF) must be installed downstream from a catalytic converter, or in conjunction with a catalytic converter.

A common DPF comprises a porous ceramic matrix with parallel passageways through which exhaust gas passes. Particulate matter subsequently accumulates on the surface of the filter, creating a buildup which must eventually be removed to prevent obstruction of the exhaust gas flow. Common forms of particulate matter are ash and soot. Ash, typically a residue of burnt engine oil, is substantially incombustible and builds slowly within the filter. Soot, chiefly composed of carbon, results from incomplete combustion of fuel and generally comprises a large percentage of particulate matter buildup. Various conditions, including, but not limited to, engine operating conditions, mileage, driving style, terrain, etc., affect the rate at which particulate matter accumulates within a diesel particulate filter.

Accumulation of particulate matter typically causes backpressure within the exhaust system. Excessive backpressure on the engine can degrade engine performance. Generally, particulate matter accumulated on the particulate filter is removed by oxidizing the particulate matter on the filter. If too much particulate matter has accumulated when oxidation begins, the oxidation rate may get high enough to cause an uncontrolled temperature excursion. The resulting heat can destroy the filter and damage surrounding structures. Recovery can be an expensive process.

To prevent potentially hazardous situations, accumulated particulate matter is commonly oxidized and removed in a controlled regeneration process before excessive levels have accumulated. To oxidize the accumulated particulate matter, exhaust temperatures generally must exceed the temperatures typically reached at the filter inlet. Various methods are used to increase the filter inlet exhaust gas temperature and initiate regeneration of a diesel particulate filter.

Conventionally, the filter regeneration event occurs when the exhaust gas temperature is sufficiently increased and substantial amounts of soot are oxidized on the particulate filter. Two types of particulate matter oxidation can occur. First, oxidation can occur in the presence of $NO_2$ at modest filter temperatures (e.g., between about 250° C. and about 400° C.) achieved by modest exhaust gas temperatures to consume modest amounts of particulate matter. Filter regeneration where oxidation occurs in the presence of $NO_2$ is hereinafter referred to as "noxidation regeneration." Second, oxidation can occur in the presence of oxygen at high filter temperatures (e.g., greater than about 400° C.) achieved by high exhaust gas temperatures to consume large amounts of particulate matter. Filter regeneration where oxidation occurs in the presence of oxygen is hereinafter referred to as "oxidation regeneration." Unfortunately, the engine exhaust gas temperatures necessary to initiate oxidation regeneration are often sufficiently high to cause safety concerns, premature component failures, and abnormally high wear on the engine.

One engine operating condition of particular relevance to the rate of particulate accumulation on and regeneration of a particulate filter is whether the engine is idling. An engine is idling, i.e., operating in an idle mode, when the engine is not under a load or producing meaningful work, such as engaging a drive shaft to propel a vehicle. Idling typically occurs when the engine is operating within a low engine speed range that is dependent on the type and configuration of the engine. For example, in some conventional diesel internal combustion engines, the engine is idling when operated within an RPM range between approximately 700 RPM and approximately 2,000 RPM, and relatively no work is being performed by the engine.

During extended idling operations of a diesel engine, the particulate filter is prone to filling up with particulate matter at normal idle exhaust gas temperatures. Conventional engine control systems typically wait until a sufficient amount of particulate matter has accumulated on the filter during extended periods of idling operation before commanding a controlled oxidation regeneration of the filter. As discussed above, controlled oxidation regeneration typically consists of driving the filter temperature up to controlled oxidation regeneration temperature levels for a predetermined time period such that oxidation of particulate matter accumulated on the filter takes place. Such large increases in the filter temperature require an equally large increase in the engine exhaust gas temperatures. Because the temperature of exhaust gas generated by the engine when operating in the idle mode is relatively low compared to other engine operating conditions, the temperature swing required to initiate a controlled regeneration event during idle operating conditions is very high. The larger the temperature swing, the less efficient the engine and the more prone the engine is to wear and fatigue.

Based on the foregoing, a need exists for an engine controls strategy that reduces the engine exhaust gas temperature and temperature swing necessary to control particulate matter accumulation on a particulate matter filter during idling operations of the engine.

SUMMARY

The subject matter of the present application has been developed in response to the present state of the art, and in particular, in response to the problems and needs in the art that have not yet been fully solved by currently available engine controls strategies for controlling particulate matter accumulation on particulate matter filters. Accordingly, the subject matter of the present application has been developed to provide apparatus, systems, and methods for controlling the engine exhaust gas temperature to achieve a desired regeneration event on a particulate filter that overcomes many of the shortcomings of the prior art.

For example, according to one representative embodiment, an apparatus for controlling the accumulation of particulate matter on a particulate matter filter of an engine system during extended idling of the engine includes a regeneration event timing module, an engine speed module, an exhaust gas temperature module, and a thermal management module. The regeneration event timing module is configured to determine a regeneration event timing strategy for implementation during extended idling of the engine. The regeneration event timing strategy includes a first time period and a second time period following the first time period. The engine speed module is configured to determine a desired engine speed for the second time period and operate the engine at the desired engine speed during the second time period. The desired engine speed is greater than an idling engine speed associated with the first time period. The exhaust gas temperature module is configured to determine a desired particulate matter filter inlet exhaust gas temperature. The desired particulate matter filter inlet exhaust gas temperature corresponds to a particulate matter filter temperature for achieving a noxidation regeneration of particulate matter on the particulate matter filter. The thermal management module is configured to modulate at least one engine system component to achieve the desired particulate matter filter inlet exhaust gas temperature during the second time period.

The at least one engine system component can include an air intake throttle and a variable geometry turbine (VGT) device. The thermal management module modulates the air intake throttle and VGT device by closing the air intake throttle and VGT device. The at least one engine system component can also be a fuel delivery system. The fuel delivery system can be modulated by injecting fuel into the engine according to a regeneration fuel injection strategy that includes at least one heat post-injection and at least one non-heat post injection.

In some implementations of the apparatus, the first time period and the second time period comprise a timing cycle. The regeneration event timing strategy can include a plurality of timing cycles.

According to certain implementations, the first time period is about two times longer than the second time period. For example, the first time period is between about 0 hours and about 24 hours, and the second time period is between about 0.5 hours and about 2 hours. The desired engine speed can be between about 0% and about 30% higher than the idling engine speed. Further, the particulate matter filter temperature can be between about 250° C. and about 400° C.

In some exemplary implementations, during extending idling of the engine, the percent increase of the amount of particulate matter accumulated on the particulate matter filter from any point in time to any other point in time does not exceed about 100%.

According to another embodiment, a method for controlling the accumulation of particulate matter on a particulate matter filter of an engine system during idling engine operating conditions includes operating the engine at an idling operating condition engine exhaust gas temperature and engine speed for a first time period. The method also includes increasing a speed of the engine up to a desired engine speed at the beginning of a second time period following the first time period. The desired engine speed is higher than the idling operating condition engine speed. Additionally, the method includes closing an air intake throttle near the beginning of the second time period to increase the temperature of engine exhaust gas by a first amount and closing a VGT device near the beginning of the second time period to increase the temperature of the engine exhaust gas by a second amount. The method further includes injecting fuel into the engine according to a post-injection fueling strategy near the beginning of the second time period to increase the temperature of the engine exhaust gas by a third amount. Exhaust entering the particulate matter filter at the idling operating condition engine exhaust gas temperature plus the first exhaust gas increase amount, second exhaust gas increase amount, and third exhaust gas increase amount facilitates a noxidation regeneration event on the particulate matter filter.

According to some implementations, the method also includes maintaining the desired engine speed, first exhaust gas increase amount, second exhaust gas increase amount, and third exhaust gas increase amount until the end of the second time period such that a noxidation regeneration event occurs during substantially the entire second time period. The amount of particulate matter accumulated on the particulate matter filter at the beginning of the first time period can be substantially the same as or higher than the amount of particulate matter accumulated on the particulate matter filter at the end of the second time period.

In some implementations, the engine continuously operates at idling operating conditions for a period of time greater than the first time period plus the second time period. In such implementations, the method includes decreasing the speed of the engine and engine exhaust gas temperature to the idling operating condition engine speed and exhaust gas temperature at the beginning of a third time period following the second time period and operating the engine at the idling operating condition engine speed and engine exhaust gas temperature for the third time period. The engine exhaust gas temperature is decreased by opening the air intake throttle, opening the VGT device, and stopping the post-injection fueling strategy. The method according to such implementations also includes (i) increasing a speed of the engine up to the desired engine speed at the beginning of a fourth time period following the third time period, (ii) closing the air intake throttle near the beginning of the fourth time period to increase the temperature of engine exhaust gas by the first amount, (iii) closing the VGT device near the beginning of the fourth time period to increase the temperature of the engine exhaust gas by the second amount, and (iv) injecting fuel into the engine according to the post-injection fueling strategy near the beginning of the fourth time period to increase the temperature of the engine exhaust gas by the third amount.

According to specific implementations, the method includes maintaining the percent increase of particulate matter accumulation at any time during a period of continuous idling operating conditions at less than 1,000%.

In some implementations of the method, the engine system includes a catalytic component in exhaust transmitting communication with the particulate matter filter. Injecting fuel can include injecting at least one heat post-injection for increasing the temperature of engine outlet exhaust gas by an amount equal to a portion of the third amount and injecting at least one non-heat post-injection for increasing the temperature of catalytic component outlet exhaust gas by an amount equal to the remaining portion of the third amount.

According to yet another embodiment, an internal combustion engine system includes an internal combustion engine capable of producing an engine exhaust gas stream, a catalytic component in exhaust gas receiving communication with the internal combustion engine, and a particulate matter filter in exhaust gas receiving communication with the catalytic component. The system also includes an air intake throttle coupled to the internal combustion engine and regulating the flow rate of air into the engine, a VGT including actuatable vanes and being in exhaust gas receiving communication with the internal combustion engine, and a fuel delivery system including a plurality of injectors communicable in fuel injecting communication with the engine. Further, the system includes a controller operable to alternate operation of the engine between an idling mode and a regeneration mode while the engine is continuously idling. The transition from the idling mode to the regeneration mode includes increasing the engine speed, closing the air intake throttle, closing the VGT vanes, and post-injecting fuel into the engine. The temperature of exhaust gas entering the particulate matter filter during the regeneration mode promotes a noxidation regeneration event on the particulate matter filter.

In some implementations of the system, the transition from the regeneration mode to the idling mode includes decreasing the engine speed to an idling engine speed, opening the air intake throttle, opening the VGT vanes, and suspending fuel post-injections into the engine.

According to some implementations, increasing the engine speed, closing the air intake throttle, closing the VGT vanes, and injecting the at least one heat post-injection increases the engine outlet exhaust gas temperature by a predetermined amount.

In certain instances, while the engine is continuously idling, the amount of particulate matter accumulated on the particulate matter filter does not increase by more than 100%.

In some implementations of the system, while the engine is continuously idling, the amount of particulate matter accumulated on the particulate filter between one idling mode and the next regeneration mode steadily increases from a first minimum amount to a maximum amount during idling modes and steadily decreases from the maximum amount to a second minimum amount during regeneration modes. The difference between the minimum amount and maximum amount can be less than about 30 grams.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
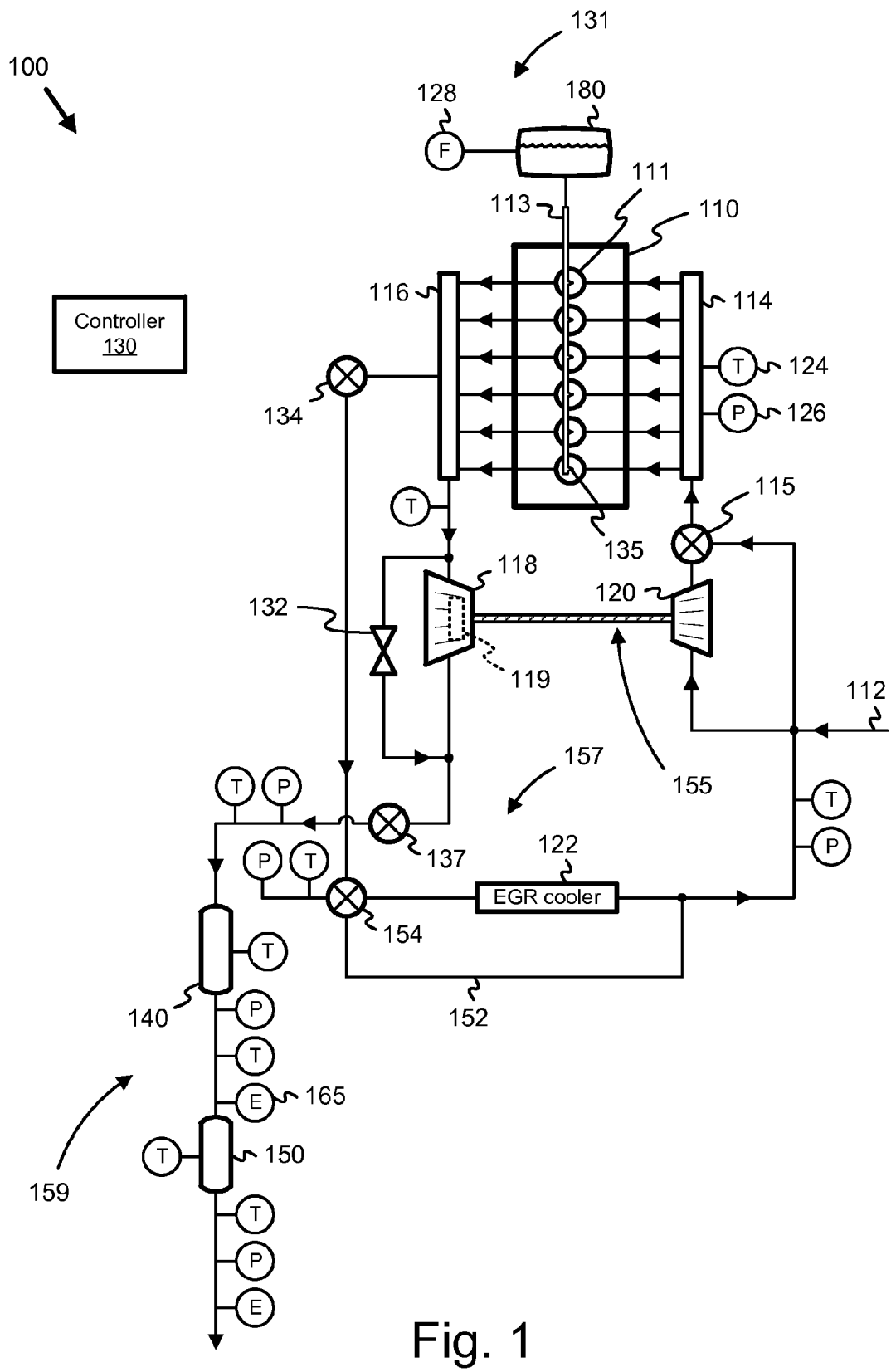
FIG. 1 is a schematic diagram of an engine system having a particulate filter according to one embodiment.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the subject matter described herein may be combined in any suitable manner in one or more embodiments. In the following description, numerous specific details are provided, such as examples of controls, structures, algorithms, programming, software modules, user selections, network transactions, database queries, database structures, hardware modules, hardware circuits, hardware chips, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

FIG. 1 depicts one exemplary embodiment of an internal combustion engine system, such as a diesel engine system 100, in accordance with the present invention. As illustrated, the engine system 100 includes a diesel engine 110, a controller 130, a fuel delivery system 131, a turbocharger system 155, an exhaust gas recirculation (EGR) system 157, and an exhaust gas aftertreatment system 159.

The engine 110 includes an air inlet 112, intake manifold 114, and exhaust manifold 116. The air inlet 112 is vented to the atmosphere, enabling air to enter the engine 110. The air inlet 112 is connected to an inlet of the intake manifold 114. The intake manifold 114 includes an outlet operatively coupled to combustion chambers 111 of the engine 110. The air from the atmosphere is combined with fuel to power, or otherwise, operate the engine 110. The fuel is delivered into the combustion chambers 111 by the fuel delivery system 131. The fuel delivery system 131 includes a fuel tank 180 for storing the fuel and a fuel pump (not shown) for delivery the fuel to a common rail 113. From the common rail, the fuel is injected into combustion chambers 111 through one of several fuel injectors 135. The timing and dosage of fuel into the combustion chambers 111 is controlled by the controller 130. Combustion of the fuel produces exhaust gas that is operatively vented to the exhaust manifold 116.

The quantity of air entering the intake manifold 114 and thus the combustion chambers 111 is regulated by an intake throttle 115 operatively coupled to an accelerator pedal (not shown). The position of the intake throttle 115 and the quantity of air entering the intake manifold 114 corresponds at least partially to the position of the accelerator pedal. The intake throttle 115 also is in electrical communication with the controller 130 and controllable by the controller. The controller 130 is operable to regulate the quantity of air entering the intake manifold 114 independent of the position of the accelerator pedal.

From the exhaust manifold 116, the exhaust gas flows into at least one of three systems, i.e., the turbocharger system 155, the EGR system 157, and the exhaust gas aftertreatment system 159. For example, based at least partially on the operating conditions of the engine, a portion of the exhaust gas can be directed into the turbocharger system 155, a portion of the exhaust gas can be directed into the EGR system 157, and a portion of the exhaust gas can be directed into the exhaust aftertreatment system 159. The relative portions of exhaust gas entering the respective systems 155, 157, 159 are controlled by the controller 130. Generally, the controller 130 determines the relative portions of exhaust gas that should enter the respective systems and commands valves, e.g., turbine by-pass valve 132, EGR valve 134, and exhaust throttle 137 valve, to allow a portion of the exhaust corresponding to the determined portions to enter the respective systems.

The turbocharger system 155 includes a turbocharger turbine 118, turbocharger compressor 120, and the turbocharger bypass valve 132. The turbocharger bypass valve 132 is selectively operable to regulate the flow of exhaust gas into the turbocharger turbine 118. The exhaust gas entering the turbine 118 causes the turbine to drive the compressor 120. When driven by the turbine 118, the compressor 120 compresses engine intake air before directing it to the intake manifold 114. Generally, the faster the rotational speed of the turbine 118, the more compressed the intake air. Accordingly, at high turbine speeds, the mass charge flow rate, i.e., the amount/mass of air per volumetric flow rate, is increased such that the amount of air entering the intake manifold 114 is increased even if the volumetric flow rate of air remains constant.

In certain implementations, the turbocharger turbine 118 is a variable geometry turbine (VGT) having a VGT device 119 such as is commonly known in the art. The VGT device 119 can be a series of movable vanes for controlling the flow of exhaust hitting the blades of the turbine. For example, in conventional applications, at low engine speeds, the exhaust velocity is insufficient to effectively spin the turbine. Accordingly, at low engine speeds, the vanes can be moved into a relatively closed position such that the spaces between the vanes are relatively small. As the exhaust passes through the small spaces, it accelerates and is redirected to contact the turbine blades at a specific angle for optimum or fully-enhanced rotation of the blades. In other words, when in the closed position, the vanes accelerate and redirect exhaust to increase the turbine's speed and compression of the air. In contrast, at high engine speeds, the exhaust velocity is sufficient to effectively spin the turbine. Accordingly, at high engine speeds, the vanes can me moved into a relatively open position such that the spaces between the vanes are relatively large. As the exhaust passes through the large spaces, its velocity remains relatively constant and experiences minimal redirection such that the blades of the turbine experience a less enhanced rotation. The controller 130 controls the positions of the vanes via an actuator in electrical communication with the controller 130.

The EGR system 157 includes an EGR cooler 122, an EGR valve 134, and an EGR cooler bypass valve 154. The EGR valve is selectively controlled by the controller 130 to regulate the flow of exhaust entering the EGR system 157 from the exhaust manifold, and thus indirectly regulating the flow of exhaust entering the aftertreatment system 159. When the EGR valve is at least partially open, at least a portion of the engine exhaust enters the EGR system 157 and is re-circulated into the combustion chambers 111 of the engine 110 to be combusted with air from the air intake 112. Prior to entering the combustion chambers 111, the EGR exhaust gas can be passed through the EGR cooler 122 to cool the exhaust gas in order to facilitate increased engine air inlet density. The EGR cooler bypass valve 154 is operatively controlled by the controller 130 to regulate the amount of EGR exhaust passing through the EGR cooler 122 and the amount of EGR exhaust gas bypassing the EGR cooler 122 via an EGR bypass line 152.

In addition to the VGT device 119 and the EGR valve 134, the flow rate of exhaust entering the exhaust aftertreatment system 159 can be regulated by the exhaust throttle 137 positioned within the exhaust stream between the catalytic component 140 and the turbocharger system 155. Like the VGT device 119, the exhaust throttle 137 is actuatable between a closed position and an open position. The closed position corresponds with a minimum space through which exhaust gas can pass and the open position corresponds with a maximum space through which exhaust gas can pass. As the space through which the exhaust flows is reduced, the flow rate of the exhaust is reduced. Therefore, as the exhaust throttle 137 moves from the open position to the closed position, the flow rate of exhaust entering the aftertreatment system 159 decreases. Similarly, as the exhaust throttle 137 moves from the closed position to the open position, the flow rate of exhaust entering the aftertreatment system 159 increases.

The valve positions of the VGT device 119 and exhaust throttle 137 affect the load on the engine and thus the temperature of the exhaust gas. For example, when the VGT device 119 is in a closed position, a backpressure is created in the exhaust manifold. In order to overcome the backpressure in the exhaust, the engine must increase its pumping work, e.g., load. The increased pumping work results in an increase in the engine outlet exhaust gas temperature because additional fuel is introduced and combusted to compensate for the increase in pumping work. Similar to the VGT device 119, the more closed the exhaust throttle 137 valve position, the more backpressure created in the exhaust manifold, and the more pumping work performed by the engine. Accordingly, in certain instances, the temperature of the engine outlet exhaust can be increased by closing at least one of the VGT device 119 and exhaust throttle 137. For example, in some implementations, the VGT device 119 and exhaust throttle 137 can be controlled independent of each other to increase the engine outlet exhaust gas temperature. Alternatively, the VGT device 119 and exhaust throttle 137 can be dependently or cooperatively controlled to provide more precise control of the engine outlet exhaust temperature.

The exhaust aftertreatment system 159 includes a catalytic component 140 and a particulate filter 150 downstream of the catalytic component 140. Exhaust gas passes through one or more catalytic components, such as catalytic component 140, to reduce the number of pollutants in the exhaust gas prior to the gas entering the particulate filter. In certain implementations, the catalytic component 140 is a conventional diesel oxidation catalyst. The pollutants, e.g., carbon monoxide, particulate matter, and hydrocarbons, are reduced in an oxidation process within the catalytic component 140. Typically, for oxidation of the pollutants to occur, the catalyst of the catalytic component 140 much be at a temperature within a predetermined range, e.g., between about 250° C. and about 300° C. in some instances. The temperature of the catalytic component 140 is regulated by controlling the engine outlet exhaust temperature. The exothermic oxidation process for reducing the pollutants in the exhaust also causes the temperature of the exhaust to increase such that during an oxidation event on the catalytic component 140, the catalytic component outlet temperature is greater than the catalytic component inlet temperature.

In some implementations, fuel is added to the exhaust prior to entering the catalytic component 140. The added fuel participates in and intensifies the exothermic oxidation process. In certain instances, the fuel is added via internal injections (e.g., heat post-injections and/or non-heat post-injections) and/or external injections. Internal fuel dosing strategies include injecting additional fuel into the compression cylinders. Such in-cylinder injections include pre-injections or fuel injections occurring before a main fuel injection and post-injections or fuel injection occurring after a main fuel injection. Generally, post-injections include heat post-injections and non-heat post-injections. Heat post-injections are injections that participate along with the main fuel injection in the combustion event within the cylinder and occur relatively soon after the main fuel injection. Non-heat post injections are injections that occur later in the duty cycle compared to the heat post-injections and do not participate in the combustion event within the cylinder. External fuel dosing strategies include injecting fuel into the exhaust gas stream at locations downstream of the engine. Typically, external fuel dosers are positioned in the exhaust aftertreatment system between the engine and the catalytic component 140, e.g., a diesel oxidation catalyst (DOC).

Although the engine system 100 shown in FIG. 1 uses an internal fuel injection approach to controlling the exhaust gas temperature for regeneration events, in other embodiments, an external fuel injection approach can be used in conjunction with the non-additive fuel injection strategies described herein. The external fuel injection approach can be the same as or similar to the approach described in U.S. Pat. No. 7,263,825, which is incorporated herein by reference.

The oxidation process initiated in the catalytic component 140 heats the exhaust and causes the temperature of the exhaust to increase. Because fuel in the exhaust participates in the oxidation process, the exhaust temperature differential across the DOC, and thus the DOC outlet exhaust gas temperature, is largely dependent upon the amount of fuel in the exhaust gas entering the DOC. The added fuel raises the temperature of the exhaust exiting the catalytic component 140 by participating in the exothermic oxidation reaction. The amount of fuel added to the exhaust gas is proportional to the increase in the exhaust gas temperature across the catalytic component 140.

As discussed above, the particulate filter 150 filters particulate matter from the exhaust gas stream before the exhaust gas is vented to the atmosphere. The particulate matter builds on the face of the particulate filter catalyst and thus the particulate filter 150 requires periodic regeneration to remove the particulate matter from the filter. Generally, the controller 130 determines whether a regeneration event is required and directs a regeneration event on the filter 150.

The engine system 100 also includes various sensors, such as temperature sensors 124, pressure sensors 126, fuel sensor 128, exhaust gas flow sensors 165, and the like, strategically disposed throughout the engine system 100. The various sensors may be in communication with the controller 130. Generally, the controller 130 interprets the signals from the sensors to determine and monitor the operating conditions of the engine system 100. In one embodiment, the fuel sensor 128 senses the amount of fuel consumed by the engine, and the exhaust gas flow sensors 165 sense the rate at which exhaust gas is flowing into the particulate filter 150.

Engine operating conditions regarding the fraction of exhaust gas recirculation, injection timing, and the like, can be ascertained from the sensors or from the commands generated by the controller 130. In one embodiment, information is gathered or ascertained regarding, for example, fueling rate, engine speed, engine load, the timing at which fuel injection timing is advanced or retarded (SOI, or start of injection), time passed, fraction of exhaust gas recirculation, driving conditions, whether and when regenerations have occurred and the rate such regenerations have removed particulate matter, exhaust flow rate, the amount of $O_2$ and $NO_2$ in the exhaust, filter temperature, exhaust gas pressure, filter particulate load amount and uniformity, etc.

Figure 2:
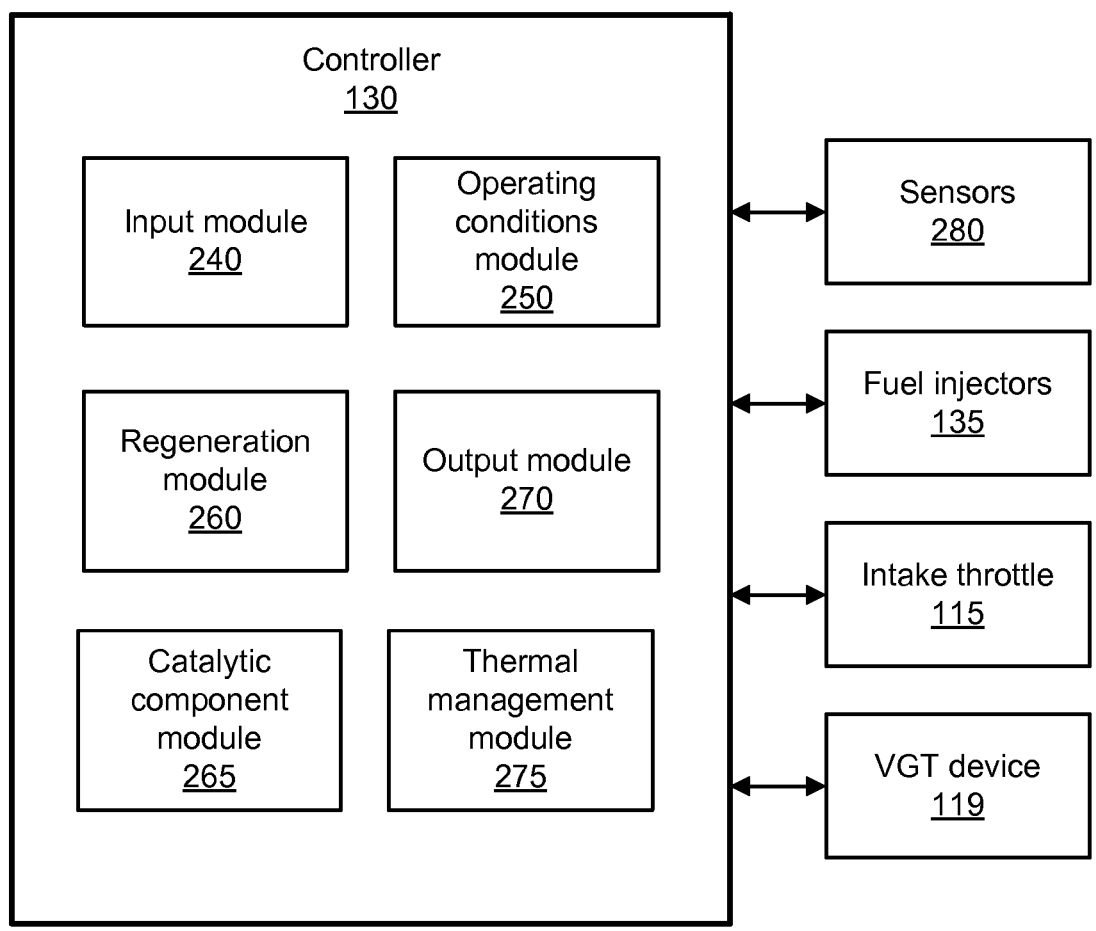
FIG. 2 is a schematic diagram of a controller of the engine system according to one embodiment.

FIG. 2 depicts a control system 200 according to one representative embodiment. The control system 200 comprises the controller 130, the intake throttle 115, the VGT device 119, the exhaust throttle 137, sensors 280 (e.g., sensors 124, 126, 128, 165), the catalytic component 140, and the fuel injectors 135. Although not shown, in some embodiments, the control system 200 includes the exhaust throttle 137 instead of, or in addition to, the VGT device 119. The controller 130 includes an input module 240, an operating conditions module 250, a regeneration module 260, a catalytic component module 265, an output module 270, and a thermal management module 275.

As is known in the art, the controller 130 may include processor, memory, and interface modules that may be fabricated of semiconductor gates on one or more semiconductor substrates. Each semiconductor substrate may be packaged in one or more semiconductor devices mounted on circuit cards. Connections between the modules may be through semiconductor metal layers, substrate-to-substrate wiring, or circuit card traces or wires connecting the semiconductor devices. The controller 130 in FIG. 1 is depicted as a single physical unit, but can include two or more physically separated units or components in some embodiments if desired. Generally, the controller 130 receives multiple inputs, processes the inputs, and transmits multiple outputs. The multiple inputs may include sensed measurements from the sensors and various user inputs. The inputs are processed by the controller 130 using various algorithms, stored data, and other inputs to update the stored data and/or generate output values. The generated output values and/or commands are transmitted to other components of the controller and/or to one or more elements of the engine system 100 to control the system to achieve desired results, and more specifically, achieve desired exhaust gas emissions at the tailpipe.

The sensors 280 are configured to determine a plurality of conditions within the engine system 100, including temperature, pressure, exhaust gas flow rate, engine speed, engine torque, etc. The input module 240 is configured to input the conditions sensed by the sensors 280 and provide corresponding inputs to the operating conditions module 250. In certain implementations, the input module 240 inputs temperature signals associated with the temperatures of the exhaust at various locations along the engine exhaust stream. For example, the input module 240 inputs the sensed engine outlet exhaust temperature signal (e.g., the temperature of exhaust prior to the turbine 118), the sensed DOC 140 inlet exhaust temperature signal, the sensed particulate filter inlet exhaust temperature signal (e.g., the DOC outlet exhaust temperature), the sensed or modeled DOC catalyst temperature signal, and particulate filter 150 catalyst temperature signal. The input module 240 also inputs signals from speed and torque sensors (not shown) coupled to the engine 110. The conditions module 250 is configured to interpret the sensor signals and determine information regarding current operating conditions of the engine system 100. For example, the operating conditions module 250 determines the engine operating speed and torque 405 based on input signals from the speed and torque sensors of the engine 110.

The output module 270 is configured to direct the fuel injectors 135 to inject fuel into the compression chambers of the engine 110 according to a fuel injection strategy determined by the thermal management module 275. Further, the output module 270 is configured to direct the intake throttle 115 to regulate the flow rate of intake air into the intake manifold 114 according to a desired intake air flow rate determined by the thermal management module 275. The output module 270 also is configured to command the VGT device 119 into a desired configuration determined by the thermal management module 275. Further, in certain implementations, the output module 270 is configured to direct the exhaust throttle 137 to regulate the flow rate of exhaust entering the exhaust aftertreatment system 159 according to a desired aftertreatment system exhaust flow rate determined by the thermal management module 275.

Figure 3:
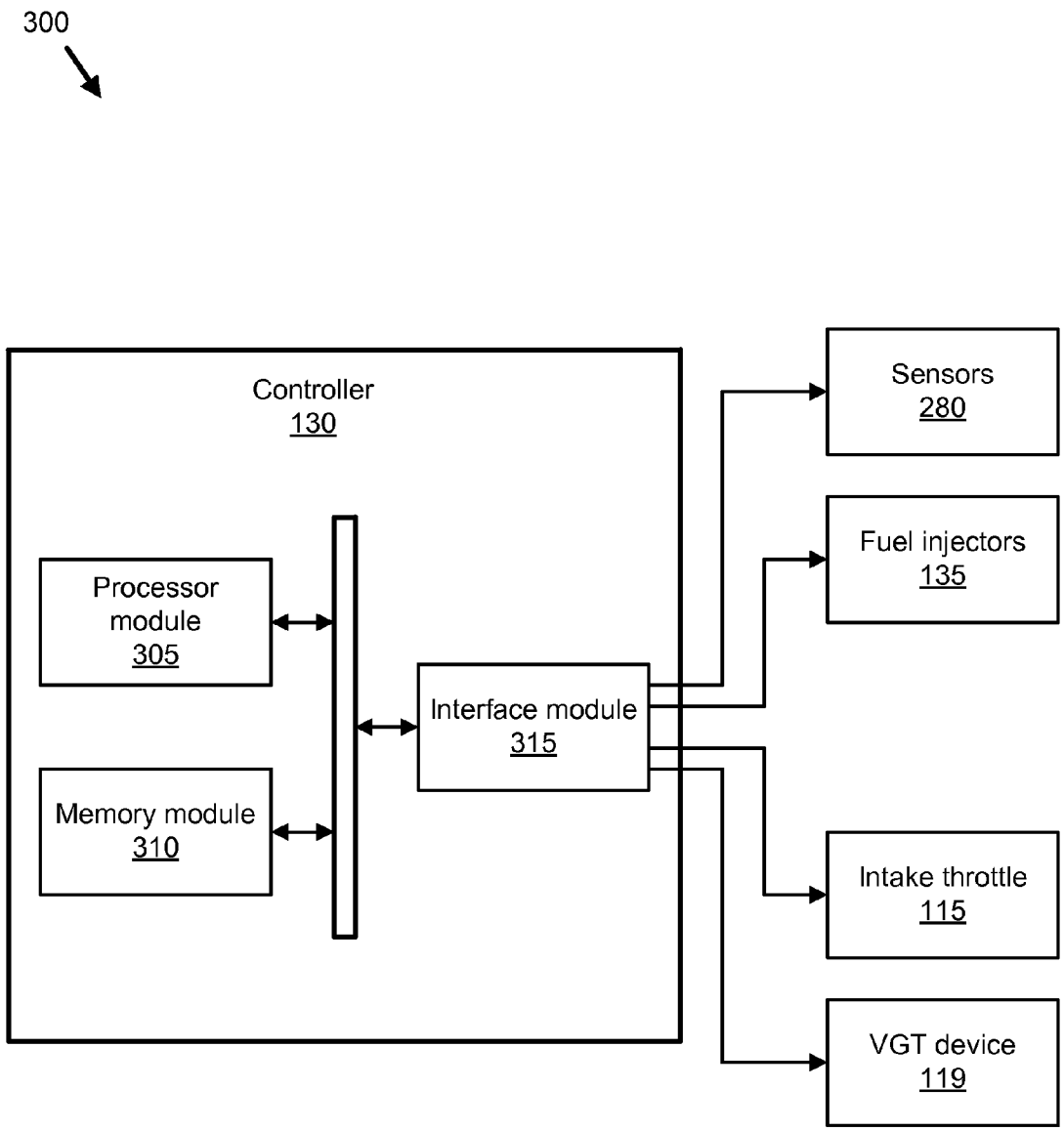
FIG. 3 is a schematic diagram of a controller of the engine system according to another embodiment.

FIG. 3 is a schematic block diagram illustrating another embodiment of a control system 300 similar to control system 200 of FIG. 2. The controller 130 is depicted as comprising a processor module 305, memory module 310, and interface module 315. The processor module 305, memory module 310, and interface module 315 may be fabricated of semiconductor gates on one or more semiconductor substrates. Each semiconductor substrate may be packaged in one or more semiconductor devices mounted on circuit cards. Connections between the processor module 305, the memory module 310, and the interface module 315 may be through semiconductor metal layers, substrate to substrate wiring, or circuit card traces or wires connecting the semiconductor devices.

The memory module 310 stores software instructions and data comprising one or more software processes. The processor module 305 executes the software processes as is known to those skilled in the art. In one embodiment, the processor module 305 executes one or more software processes carried out by the conditions module 250, regeneration module 260, and thermal management module 275 of FIG. 2.

The processor module 305 may communicate with external devices and sensors, such as the sensors 280, the fuel injectors 135, the intake throttle 115, the VGT device 119, and, in certain implementations, the exhaust throttle 137, through the interface module 315. For example, the sensors 280 may comprise a pressure sensor 126 (FIG. 1), with the sensors 280 communicating an analog signal representing a pressure value to the interface module 315. The interface module 315 may periodically convert the analog signal to a digital value and communicate the digital value to the processor module 305.

The interface module 315 may also receive one or more digital signals through a dedicated digital interface, a serial digital bus communicating a plurality of digital values, or the like. For example, the sensors 280 may comprise the air-flow sensor 156 of FIG. 1 and communicate a digital air flow value to the interface module 315. The interface module 315 may periodically communicate the digital air flow value to the processor module 305. In one embodiment, the interface module 315 executes one or more communication processes carried out by the input module 240 and output module 270 of FIG. 2.

The processor module 305 may store digital values such as the pressure value and the air flow value in the memory module 310. In addition, the processor module 305 may employ the digital values in one or more calculations including calculations carried out by the operating conditions module 250 and regeneration module 260. The processor module 305 may also control one or more devices, such as the fuel injectors 135, intake throttle, 115, VGT device 119, and exhaust throttle 137 through the interface module 315.

Figure 4:
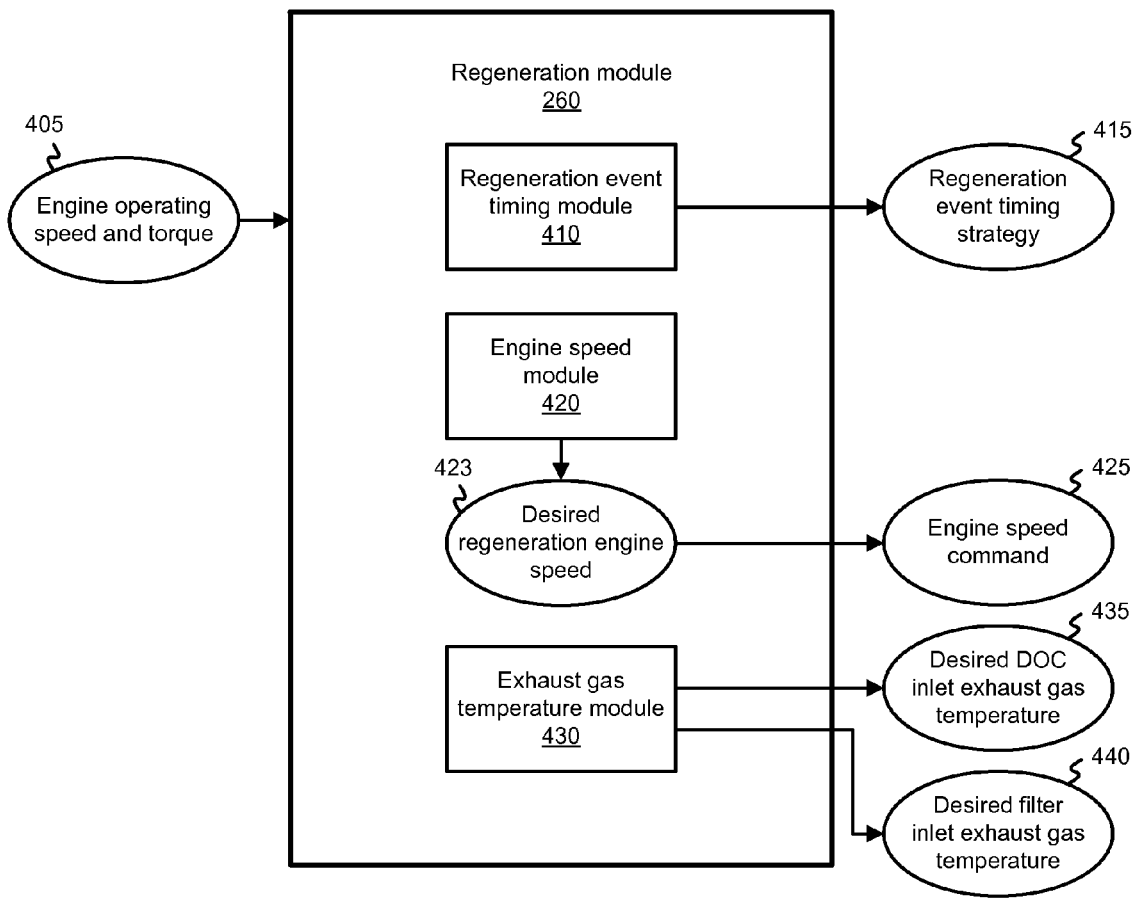
FIG. 4 is a schematic diagram of a regeneration module of the controller of FIG. 2 according to one embodiment.

Generally, the regeneration module 260 determines a regeneration strategy for implementation during extended idle operation of the engine 110. As defined herein, extended idle operation of the engine means idling the engine for any length of time that would cause an increase of particulate matter in the particulate filter 140. Referring to FIG. 4, the regeneration module 260 receives the current engine operating speed and torque 405 from the conditions module 250. Based at least partially on the current engine operating speed and torque 405, the regeneration module 260 determines whether the engine is idling. The idling operating conditions for the engine 110, i.e., the speed and torque at which the engine is configured to idle, can be determined from predetermined operating maps calibrated to conform to the particular type and configuration of the engine being operated.

The regeneration module 260 includes a regeneration event timing module 410. If the regeneration module 260 determines that the engine is idling, the regeneration event timing module 410 determines a regeneration event timing strategy 415. The regeneration event timing strategy 415 represents idling regeneration cycles each defined by non-regeneration (e.g., idling) and regeneration time periods. The non-regeneration time periods are periods when regeneration events are not requested and regeneration time periods are period when regeneration events are requested. The relative timing or length of non-regeneration and regeneration time periods are dependent on any of various factors. Predominantly, the non-regeneration and regeneration time period characteristics are dependent on the predefined particulate matter output of the engine and the particulate matter accumulation rate on the filter. As discussed above, the particulate matter output and accumulation rate are primarily dependent on the size and configuration of the engine being operated. Other variable factors affecting the non-regeneration and regeneration time period characteristics are the condition of the particulate matter filter, environmental conditions, condition (e.g., age) of the engine components, idle speed (which can be selected by a user in certain implementations), the contiguity of idling conditions during operation of the engine, exhaust gas temperatures, and the mission status of the vehicle (e.g., whether the vehicle is in park or drive).

The regeneration event timing module 410 can determine the non-regeneration and regeneration time period characteristics by consulting a predefined operating map or look-up table. The predefined operating map can include varying time period characteristics based on one or more of the adjustable factors. Alternatively, the predefined operating map can include predetermined fixed time period characteristics based on the engine type and configuration. Generally, each cycle of the regeneration event timing strategy 415 includes a first non-regeneration period followed by a second regeneration period. For example, in one specific implementation, each cycle represents a three-hour period including a two-hour non-regeneration period followed by a one-hour regeneration period. The cycles repeat contiguously as long as the engine stays idling. During a given idling period (e.g., extended idling operation), each repeated cycle can have the same non-regeneration and regeneration time period characteristics, or the cycles can change based on the variable factors changing.

The regeneration module 260 also includes an engine speed module 420 that determines a desired regeneration engine speed 423 and issues an engine speed command 425 representing the desired regeneration engine speed. The desired regeneration engine speed 423 is the speed of the engine at which a regeneration event is to be performed during the second regeneration period. Generally, the desired regeneration engine speed 423 is higher than the idling engine speed, such that the speed of the engine must be increased from the idling speed to the desired regeneration engine speed. Accordingly, the engine speed command 425 is communicated to the fuel delivery system 131. In response to the engine speed command 425, the fuel delivery system 131 injects fuel into the engine 110 at a rate corresponding to the desired regeneration engine speed 423. In other words, the fuel delivery system 131 injects fuel at a rate that will increase the speed of the engine 110 to the desired regeneration engine speed 423. As an example, in certain engine configurations, the desired regeneration engine speed 423 is between about 900 RPM and about 2,000 RPM. In one implementation, the desired regeneration engine speed 423 is preferably about 900 RPM, but can be selectively increased, such as by a user, prior to or during a regeneration event. In certain implementations, if the vehicle is in mission, e.g., in drive, the desired engine speed 423 may be higher than when the engine is in park. For example, when the vehicle is in mission, the desired engine speed 423 may be between about 700 RPM and about 800 RPM.

Generally, the regeneration event strategy described herein is implemented when the engine is idling in park or drive and the vehicle is stationary. However, according to one embodiment, the regeneration event strategy can be implemented, or continued, even if the vehicle is moving as long as the exhaust gas temperature does not exceed an exhaust gas temperature threshold. In this embodiment, when the vehicle is moving, the desired regeneration engine speed 423 is set at a normal idle speed during the second regeneration period. For example, if the vehicle begins moving during the second regeneration period, the desired regeneration engine speed 423 is reduced to a normal idle speed until the vehicle is stopped, at which time the desired regeneration engine speed 423 is increased back to the raised desired regeneration engine speed 423.

Referring again to FIG. 4, the regeneration module 260 includes an exhaust gas temperature module 430. Based at least partially on the regeneration event timing strategy 415 and desired regeneration engine speed 423, the exhaust gas temperature module 430 determines a desired catalytic component, e.g., DOC, inlet exhaust gas temperature 435 and a desired filter inlet exhaust gas temperature 440. The DOC inlet exhaust gas temperature 435 represents the temperature of the exhaust gas entering the DOC necessary for the DOC catalyst to reach a desired bed temperature for active oxidation. The desired filter inlet exhaust gas temperature 440 represents the temperature of the exhaust gas entering the particulate matter filter 150 necessary for the particulate filter to reach a desired filter bed temperature. The desired filter bed temperature represents the bed temperature necessary to achieve the desired regeneration event scheduled to occur during the regeneration time periods as defined by the regeneration event timing strategy 415.

The desired regeneration event is a noxidation regeneration event or a regeneration event occurring at filter bed temperatures below those commonly associated with controlled or oxidation regeneration events. As discussed above, noxidation regeneration events are less likely to damage the filter or other engine components, are less likely to result in runaway temperatures, and require smaller temperature swings than controlled regeneration events. Accordingly, noxidation regeneration can be performed more often during engine idling to maintain filter loading levels at lower exhaust temperatures and flow rates associated with idling with less risk of damaging the filter. In certain embodiments, the desired filter bed temperature for performing noxidation regeneration events at a desired noxidation rate is between about 250° C. and about 400° C. Accordingly, the desired filter inlet exhaust gas temperature 440 is also between about 250° C. and about 400° C. In one representative embodiment, the desired filter bed temperature is about 357° C. and the desired filter inlet exhaust gas temperature 440 is about 357° C. The temperature of the particulate filter 140 is dependent upon the temperature of the exhaust gas entering the particulate filter. In implementations employing a platinum group metal (PGM) catalyst, the noxidation rate can also be dependent on the PGM loading value of the catalyst. Accordingly, type of catalyst used and the temperature of the exhaust must be carefully managed to ensure that a desired particulate filter inlet exhaust temperature is accurately and efficiently reached and maintained for a desired duration to achieve a noxidation regeneration event having a desired noxidation rate.

The filter inlet exhaust gas temperature is about equal to the DOC outlet exhaust gas temperature. Accordingly, the filter inlet exhaust gas temperature is about equal to the engine outlet exhaust gas temperature plus the exhaust temperature increase produced by the catalytic component 140 or DOC. The desired filter inlet exhaust gas temperature 440 then is equal to the desired DOC inlet (e.g., engine outlet) exhaust gas temperature 435 plus a desired catalytic component exhaust gas temperature increase. Therefore, the desired filter inlet exhaust gas temperature 440 is achievable by controlling at least one of the engine outlet exhaust gas temperature and the catalytic component exhaust gas temperature increase.

Figure 5:
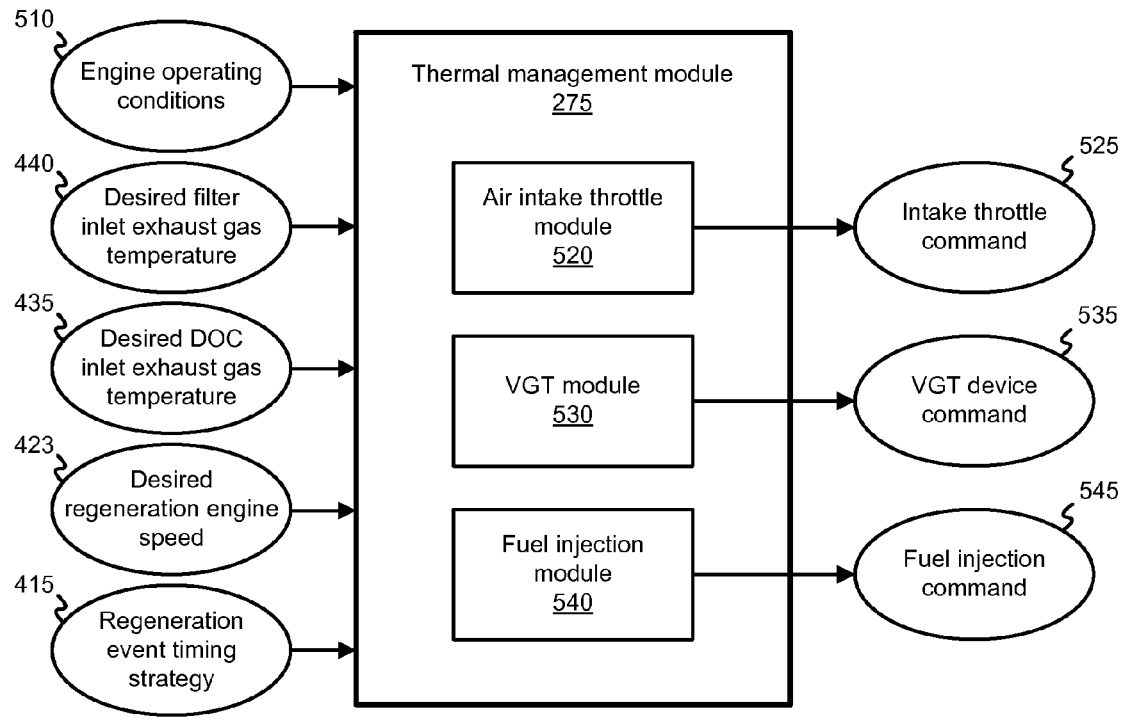
FIG. 5 is a schematic diagram of a thermal management module of the controller of FIG. 2 according to one embodiment.

Referring to FIG. 5, the regeneration module 260 communicates the regeneration event timing strategy 415, desired regeneration engine speed 423, desired DOC inlet exhaust gas temperature 435, and desired filter inlet exhaust gas temperature 440 to the thermal management module 275. Based at least partially on the engine operating conditions 510, regeneration event timing strategy 415, and desired regeneration engine speed 423, the thermal management module 275 generates a thermal management strategy for achieving the desired DOC inlet exhaust gas temperature 435 and desired filter inlet exhaust gas temperature 440. The thermal management strategy includes the relative configurations of the intake throttle 115, VGT device 119, and fuel injectors 135. In certain implementations, in addition to or in place of the VGT device 119, the thermal management strategy can also include the configuration of the exhaust throttle 137. The thermal management module 275 includes an air intake throttle module 520, a VGT module 530, and a fuel injection module 540. Although not shown, in certain implementations, the controller 130 can also include an exhaust throttle module, or the VGT module 530 can be replaced by an exhaust throttle module.

Generally, the air intake throttle module 520 issues an intake throttle command 525 representing a desired position of the air intake throttle 115 valve, the VGT module 530 issues a VGT device command 535 representing a desired position of the VGT device 119, and the fuel injection module 540 issues a fuel injection command 545 representing a desired fuel injection strategy. The desired intake throttle position, desired VGT device, and desired fuel injection strategy are determined such that when the intake throttle, VGT device, and fuel injectors are configured according to the desired configurations, the desired DOC inlet exhaust gas temperature 435 and desired filter inlet exhaust gas temperature 440 are achieved.

The air intake throttle 115 responds to the intake throttle command 525 by actuating the valve into, or maintaining the valve in, the desired position of the air intake throttle. In the desired position, a desired volumetric flow rate of air is introduced into the air intake manifold 114 and the combustion chambers 111. The amount of air in the combustion chamber affects the combustion properties and thus the engine outlet exhaust gas temperature. For example, the smaller the amount of air in the combustion chamber during combustion, the hotter the combustion event and the hotter the engine outlet exhaust gas temperature. When the air intake throttle 115 closes, the pumping work in the engine increases and additional fuel is introduced into and combusted in the engine to compensate for the increase in pumping work. The additional combusted fuel increases the temperature of the engine outlet exhaust. Accordingly, the air intake throttle 115 can be closed to increase the engine outlet exhaust temperature. Consequently, in certain implementations, the air intake throttle 115 responds to the intake throttle command 525 by closing the intake throttle position into the desired intake throttle position.

The VGT device 119 responds to the VGT device command 535 by actuating the VGT device (e.g., vanes) into, or maintaining the device in, the desired position of the VGT device. In the desired position, a desired exhaust backpressure is created in the exhaust manifold 116. In order to overcome the backpressure in the exhaust, the engine must increase its pumping work, e.g., load. The increased pumping work results in an increase in the engine outlet exhaust gas temperature. Generally, the more closed the vanes of the VGT device, the higher the exhaust backpressure and the higher the engine outlet exhaust gas temperature for a given engine speed. Accordingly, the engine outlet exhaust gas temperature can be increased by closing the VGT device 119. Similar to the VGT device 119, the exhaust throttle 137 can also be manipulated, e.g., closed, to adjust the exhaust backpressure and engine outlet exhaust gas temperature.

The fuel delivery system 131 responds to the fuel injection command 545 by injecting fuel into the compression chambers according to the fuel injection strategy represented by the fuel injection command. Generally, the fuel injection command 545 includes instructions for performing a multiple-injection event for each combustion cycle of the engine. In certain instances, the multiple-injection event is represented by the relative timing and dosages of a plurality of fuel injections for each combustion cycle. The plurality of fuel injections includes a main fuel injection and can include one or more of pilot fuel injections, heat post-injections, and non-heat post-injections. Whether a post-injection is a heat or non-heat type post-injection depends largely on the timing of the injection, which is defined according to the crank angle of the crankshaft when the injection is scheduled to occur as discussed in U.S. patent application Ser. Nos. 12/111,831 and 12/111,845, filed Apr. 29, 2008, which are incorporated herein by reference.

The main fuel injection occurs whether a regeneration event is occurring or not. Heat post-injections also participate in the combustion event within the cylinder. More specifically, heat post-injections occur close enough to the main fuel injection that they are involved in the combustion event driven by the main fuel injection. Because heat post-injections participate in the combustion event, they largely affect the engine outlet exhaust gas temperature. For example, including heat post-injections in the fuel injection strategy typically results in an increase in the engine outlet exhaust gas temperature. Moreover, increasing the dosage and/or delaying the timing of heat post-injection can further increase the engine outlet exhaust gas temperature.

In some implementations, a regeneration fuel injection strategy can include one or more non-heat post-injections. Because non-heat post-injections occur well after the main fuel injection, they do not participate in the combustion event within the cylinder and therefore do not substantially affect the engine outlet exhaust gas temperature. Generally, non-heat post-injections are included in fuel injection strategies to increase the DOC outlet exhaust gas temperature by enriching the exhaust gas with hydrocarbons. As discussed above, the added hydrocarbons are oxidized within the catalytic component 140 (e.g., DOC), which increases the temperature of the exhaust such that the exhaust gas exiting the DOC is higher than the temperature of the exhaust gas entering the DOC. In certain implementations, the greater the dosage of non-heat post-injections, the greater the exhaust gas temperature increase within the DOC.

A pilot fuel injection can be included in a regeneration fuel injection strategy to promote a smooth combustion event. The pilot fuel injection occurs just prior to the main fuel injection and drives a smaller combustion event preceding the main combustion event driven by the main fuel injection. The smaller combustion event promotes a gradual increase in the temperature within the compression cylinder prior to the rapid temperature increase associated with the main combustion event. Generally, the smaller combustion event reduces potential negative effects of the sudden temperature increase associated with main combustion events, e.g., engine knock and rattles.

Figure 6:
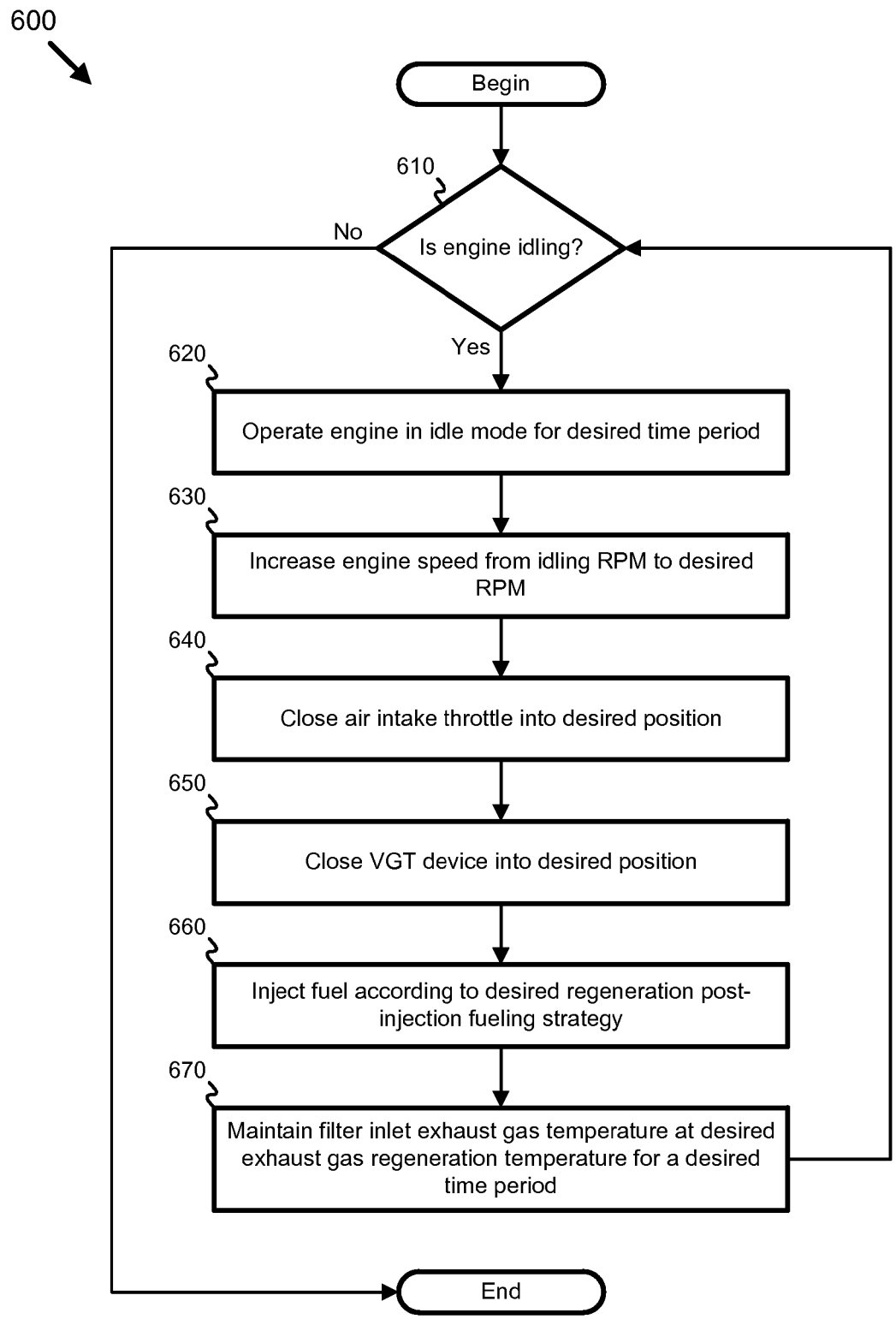
FIG. 6 is a schematic diagram of a method for controlling the accumulation of particulate matter on a particulate matter filter during extending idling of an engine according to one embodiment.

Referring to FIG. 6, a method 600 for controlling the accumulation of particulate matter on the filter 150 during idling conditions of the engine 110 is shown. The method 600 determines 610 whether the engine 110 is idling. If the engine 110 is not idling, the method 600 ends. However, if the engine 110 is idling, the engine is operated 620 or maintained in the idling condition, or idle mode, for a desired time period. The engine is operated in the idling condition by maintaining the operating speed of the engine within an RPM range associated with the idling condition. The desired time period of event 620 is based on any of various factors as discussed above. In one exemplary implementation, the desired time period is about two hours.

After the engine 110 is operated in idle mode for the desired time period, the method 600 proceeds to increase 630 the speed of the engine from the idling RPM range to a desired RPM. As discussed above, the speed of the engine 110 can be increased by opening the air intake throttle 115 and the desired RPM is based on any of various factors, such as engine type, configuration, and operating/driving conditions. In one exemplary implementation, the desired RPM is about 900 RPM. Moreover, the desired RPM can be between about 0% and about 30% higher than the idling RPM. In certain instances, when an operator of the engine manually increases the idling RPM of the engine to an idling RPM above the desired RPM (e.g., to increase the rate of temperature increase of engine coolant), the method 600 is configured to skip event 630 and proceed to event 640 with the engine speed maintained at the manually increased idling RPM.

While maintaining the engine speed at the desired RPM by injecting fuel into engine 110 at a predetermined rate, the air intake throttle 115 is closed 640 into a desired position and the VGT device 119 also is closed 650 into a desired position. The desired positions of the air intake throttle 115 and VGT device 119 are associated with a desired increase in the engine outlet exhaust gas temperature. Preferably, the desired increase is the maximum temperature increase achievable by closing the air intake throttle 115 and VGT device 119. Accordingly, the desired positions of the air intake throttle 115 and VGT device 119 are the maximum closed positions of the air intake throttle and VGT device. The maximum closed position of the air intake throttle 115 is a predefined position of the intake throttle associated with a minimum allowable air intake flow rate into the engine.

The engine outlet exhaust gas temperature is further increased by injecting 660 fuel into the combustion chambers 111 according to a desired regeneration post-injection fueling strategy having at least one heat post-injection. Similarly, the desired regeneration post-injection fueling strategy can include at least one non-heat post-injection to increase the DOC outlet exhaust gas temperature.

Increasing 630 the engine speed to the desired RPM, closing 640 the air intake throttle 115 into the desired position, closing 650 the VGT device 119 into the desired position, and injecting 660 fuel according to the desired post-injection fueling strategy each contribute to increasing the particulate matter filter inlet temperature to a desired exhaust gas regeneration temperature. The desired regeneration exhaust gas temperature corresponds with the temperature of the exhaust entering the particulate matter filter necessary to increase the temperature of the particulate matter filter to a desired particulate matter filter temperature sufficient for performing a noxidation regeneration event. The desired particulate matter filter temperature can be determined based on any of various factors, such as the condition of the filter, the type of filter, and the configuration of the engine. In one particular embodiment, the desired particulate matter filter temperature is about 357° C. (630 K).

After the desired regeneration exhaust gas temperature is reached, the filter inlet exhaust gas temperature is maintained 670 at the desired regeneration exhaust gas temperature for a desired time period. As discussed above, the desired time period is based on any of various factors. In one exemplary implementation, the desired time period of event 670 is about one hour.

After event 670 the method 600 proceeds back to event 610 to determine if the engine 110 is still idling. If the engine 110 is idling, the method 600 again implements the events 620-670. The cycle of events 620-670 continues as long as the engine is idling. Additionally, although not shown, the condition of the engine is continually checked during operation of the events 620-670. If at any moment during a cycle of events 620-670, the operating mode of the engine changes from an idling mode to a non-idling mode, the method 600 ends.

In certain embodiments, the desired time period of event 620, desired RPM, desired intake throttle position, desired VGT device position, desired post-injection fueling strategy, and the desired time period of event 670 are obtained from predefined look-up tables. In other embodiments, the desired values can be obtained using system modeling techniques commonly used in the art.

Figure 7:
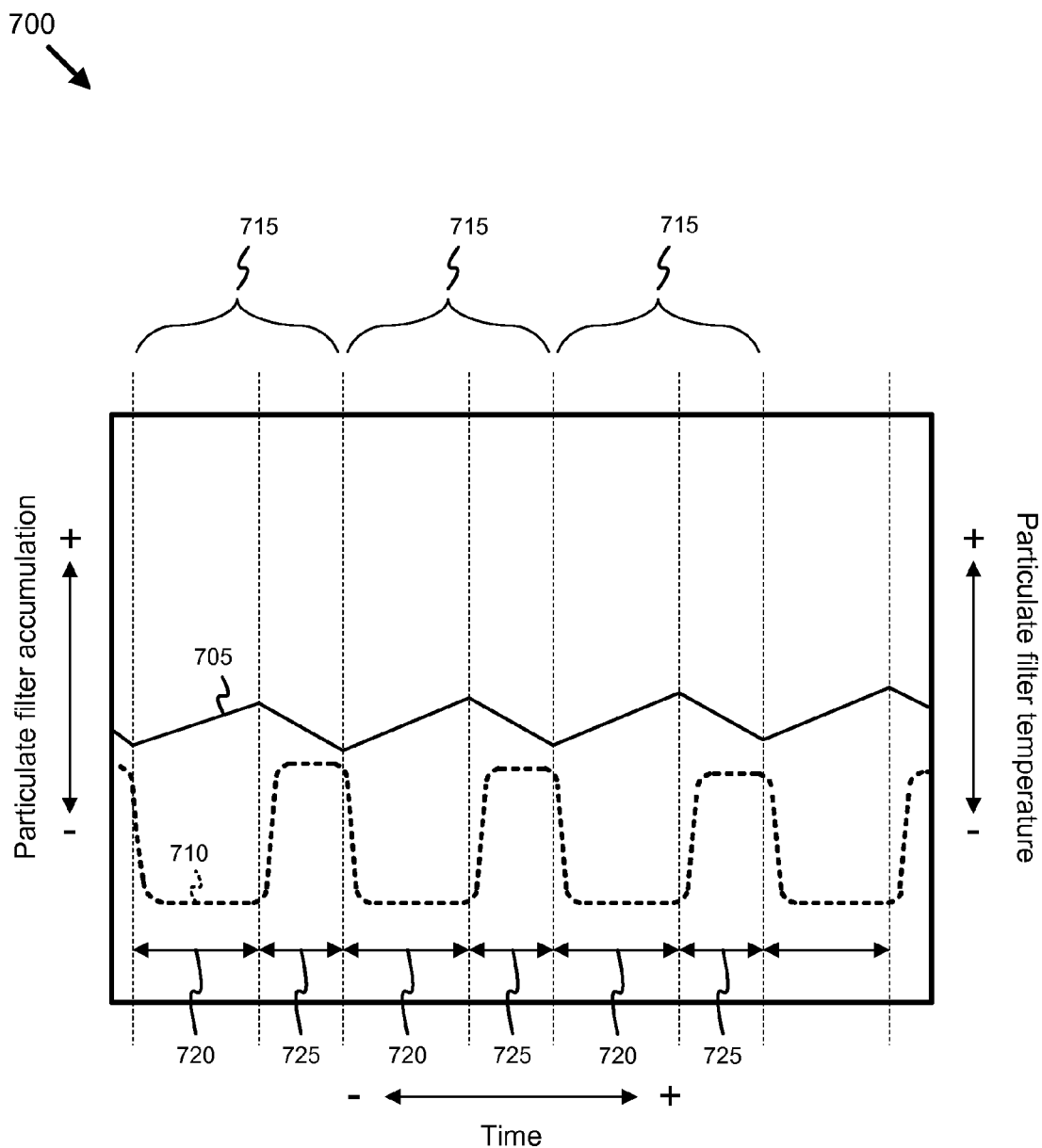
FIG. 7 is a chart comparing particulate matter accumulation and particulate filter temperature versus continuous idling operation timing according to one embodiment.

FIG. 7 shows a chart 700 comparing particulate matter accumulation 705 on the particulate filter 150 and particulate filter temperature 710 versus time during continuous idling operation of the engine 110 according to one representative embodiment of the invention. The period of continuous idling operation of the engine 110 is divided up into a series of cycles 715 with each cycle including a first idling mode time period 720 and a second idling mode time period 725.

Referring to the particulate matter accumulation line 705, during the first idling mode time periods 720, particulate matter steadily accumulates on the particulate filter 150, and during the second regeneration mode time periods 725, the particulate matter accumulation steadily decreases due to regeneration of the particulate filter. In certain instances, the rate of particulate matter filter accumulation during the first idling mode time periods 720 is less than the rate of particulate matter depletion during the second regeneration mode time periods 725. Although the particulate filter accumulation at the beginning of the idling mode time periods 720 are shown to be about equal to the particulate filter accumulation at the end of the regeneration mode time periods 725, in some embodiments, the particulate filter accumulation at the beginning of the idling mode time periods 720 is more than the particulate filter accumulation at the end of the regeneration mode time periods 725. In other words, in some embodiments, the noxidation regeneration event occurring during the second regeneration mode time periods 725 may remove more particulate matter from the filter 150 than was accumulated on the filter during the first idling mode time periods 720.

Referring to the particulate matter temperature line 710, during nearly all of the first idling mode time periods 720, the temperature of the particulate filter 150 remains steady, e.g., does not substantially increase. In contrast, during the second regeneration mode time periods 725, the temperature of the particulate filter 150 increases due to manipulation of the various engine components discussed above. As shown, the decrease in particulate matter accumulation on the particulate filter 150 substantially coincides with the increase in the temperature of the particulate filter.

The first idling mode time periods 720 can each be, for example, between about 0 hours and about 24 hours, and the second regeneration mode time periods 725 can each be, for example, between about 0.5 hours and about 2 hours. In some implementations, the first idling mode time periods 720 are approximately two times longer than the second regeneration mode time periods 725. For example, each first idling mode time period 720 can be about two hours and each second regeneration mode time period 725 can be about one hour.

Referring to FIG. 7, in some embodiments, during continuous idling operation of the engine, the percent increase of the amount of particulate matter accumulated on the particulate matter filter from any point in time to any other point in time does not exceed about 1,000%. In certain implementations, the percent increase does not exceed about 100%, e.g., about 78%. As an example only, in some instances, the difference between the minimum and maximum amounts of particulate matter accumulation during first idling mode time periods can less than about 30 grams.

The schematic flow chart diagrams and method schematic diagrams described above are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for controlling the accumulation of particulate matter on a particulate matter filter of an engine system during extended idling of the engine, comprising:

a regeneration event timing module configured to determine a regeneration event timing strategy for implementation during extended idling of the engine, the regeneration event timing strategy comprising a plurality of predetermined first fixed time periods and a plurality of predetermined second fixed time periods, wherein during extended idling of the engine the regeneration event timing strategy comprises continuously alternating between predetermined first and second fixed time periods of the plurality of predetermined first and second fixed time periods;

an engine speed module configured to determine a desired engine speed for the predetermined second fixed time periods and operate the engine at the desired engine speed during the predetermined second fixed time periods, the desired engine speed being greater than an idling engine speed associated with the predetermined first fixed time periods;

an exhaust gas temperature module configured to determine a desired particulate matter filter inlet exhaust gas temperature, the desired particulate matter filter inlet exhaust gas temperature corresponding to a particulate matter filter temperature for achieving a noxidation regeneration of particulate matter on the particulate matter filter, wherein the desired particulate matter filter inlet gas temperature is greater than an idling particulate matter filter inlet gas temperature associated with the predetermined first fixed time periods; and a thermal management module configured to modulate at least one engine system component to achieve the desired particulate matter filter inlet exhaust gas temperature during the predetermined second fixed time periods.

2. The apparatus of claim 1, wherein:

each predetermined first fixed time period and each predetermined second fixed time period comprise a timing cycle; and the regeneration event timing strategy comprises a plurality of continuous timing cycles.

3. The apparatus of claim 1, wherein the desired engine speed is between about 0% to about 30% higher than the idling engine speed.

4. The apparatus of claim 1, wherein the particulate matter filter temperature is between about 250° C. and about 400° C.

5. The apparatus of claim 1, wherein during extended idling of the engine, the percent increase of the amount of particulate matter accumulated on the particulate matter filter from any point in time to any other point in time does not exceed about 100%.

6. The apparatus of claim 1, wherein the regeneration event timing strategy comprises continuously repeating the predetermined first and second fixed time periods as long as the engine stays idling.

7. The apparatus of claim 1, wherein:

the at least one engine system component comprises an air intake throttle and a variable geometry turbine (VGT) device; and modulate comprises closing the air intake throttle and VGT device.

8. The apparatus of claim 7, wherein:

the at least one engine system component comprises a fuel delivery system; and modulate comprises injecting fuel into the engine according to a regeneration fuel injection strategy comprising at least one heat post-injection and at least one non-heat post injection.

9. The apparatus of claim 1, wherein each predetermined first fixed time period is about two times longer than each predetermined second fixed time period.

10. The apparatus of claim 9, wherein each predetermined first fixed time period is between about 0 hours and about 24 hours, and each predetermined second fixed time period is between about 0.5 hours and about 2 hours.

11. A method for controlling the accumulation of particulate matter on a particulate matter filter of an engine operating in an idle mode, the method comprising:

continuously operating the engine in the idle mode for at least first, second, third, and fourth continuous time periods;

operating the engine at an idling operating condition engine exhaust gas temperature and engine speed for the first time period;

increasing a speed of the engine up to a desired engine speed at the beginning of the second time period following the first time period, the desired engine speed being higher than the idling operating condition engine speed;

closing an air intake throttle near the beginning of the second time period to increase the temperature of engine exhaust gas by a first amount;

closing a variable geometry turbine (VGT) device near the beginning of the second time period to increase the temperature of the engine exhaust gas by a second amount;

injecting fuel into the engine according to a post-injection fueling strategy near the beginning of the second time period to increase the temperature of the engine exhaust gas by a third amount, wherein exhaust entering the particulate matter filter at the idling operating condition engine exhaust gas temperature plus the first exhaust gas increase amount, second exhaust gas increase amount, and third exhaust gas increase amount facilitates a noxidation regeneration event on the particulate matter filter;

decreasing the speed of the engine and engine exhaust gas temperature to the idling operating condition engine speed and exhaust gas temperature at the beginning of the third time period following the second time period and operating the engine at the idling operating condition engine speed and engine exhaust gas temperature for the third time period, wherein the engine exhaust gas temperature is decreased by opening the air intake throttle, opening the VGT device, and stopping the post-injection fueling strategy;

increasing a speed of the engine up to the desired engine speed at the beginning of the fourth time period following the third time period;

closing the air intake throttle near the beginning of the fourth time period to increase the temperature of engine exhaust gas by the first amount;

closing the VGT device near the beginning of the fourth time period to increase the temperature of the engine exhaust gas by the second amount; and injecting fuel into the engine according to the post-injection fueling strategy near the beginning of the fourth time period to increase the temperature of the engine exhaust gas by the third amount.

12. The method of claim 11, further comprising maintaining the desired engine speed, first exhaust gas increase amount, second exhaust gas increase amount, and third exhaust gas increase amount until the end of the second period such that a noxidation regeneration event occurs during substantially the entire second time period.

13. The method of claim 11, wherein the amount of particulate matter accumulated on the particulate matter filter at the beginning of the first time period is substantially the same as or higher than the amount of particulate matter accumulated on the particulate matter filter at the end of the second time period.

14. The method of claim 11, further comprising maintaining the percent increase of particulate matter accumulation at any time during a period of continuous idling operating conditions at less than about 1,000%.

15. The method of claim 11, wherein:

the engine system comprises a catalytic component in exhaust transmitting communication with the particulate matter filter; and injecting fuel comprises injecting at least one heat post-injection for increasing the temperature of engine outlet exhaust gas by an amount equal to a portion of the third amount, and injecting at least one non-heat post-injection for increasing the temperature of catalytic component outlet exhaust gas by an amount equal to the remaining portion of the third amount.

\* \* \* \* \*